United States Patent
Kawahara et al.

(10) Patent No.: US 6,606,697 B1
(45) Date of Patent: Aug. 12, 2003

(54) INFORMATION PROCESSING APPARATUS AND MEMORY CONTROL METHOD

(75) Inventors: Kuniaki Kawahara, Yokohama (JP); Yukihiro Seki, Yokohama (JP); Takashi Shimojo, Hadano (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 09/635,784

(22) Filed: Aug. 11, 2000

(30) Foreign Application Priority Data

Aug. 17, 1999 (JP) .......................................... 11-230394

(51) Int. Cl.⁷ .............................................. G06F 12/00
(52) U.S. Cl. ............................ 711/207; 711/6; 709/213
(58) Field of Search ............................ 711/6, 205, 206, 711/207, 159; 709/213, 1, 100

(56) References Cited

U.S. PATENT DOCUMENTS

| | | | | |
|---|---|---|---|---|
| 4,068,303 A | * | 1/1978 | Morita ........................ 711/207 |
| 4,456,954 A | * | 6/1984 | Bullions et al. ............. 711/207 |
| 5,295,251 A | * | 3/1994 | Wakui et al. ................ 709/100 |
| 5,317,710 A | * | 5/1994 | Ara et al. .................... 711/207 |
| 5,574,936 A | * | 11/1996 | Ryba et al. ..................... 711/6 |
| 5,684,974 A | * | 11/1997 | Onodera ......................... 709/1 |
| 6,081,833 A | * | 6/2000 | Okamoto et al. ........... 709/213 |

\* cited by examiner

*Primary Examiner*—Do Hyun Yoo
*Assistant Examiner*—Brian R. Peugh
(74) *Attorney, Agent, or Firm*—Mattingly, Stanger & Malur, P.C.

(57) ABSTRACT

A page table on a main storage contains a correspondence between guest virtual address and a host real address, and a TLB in a processor holds said correspondence calculated by a previous address translation. A PTBR holds a real address of a page table. When a processor detects a TLB purge, the processor starts a host when detecting a TLB purge. The host examines a virtual space change processing executed by the guest, and stores a correspondence between a new guest virtual address and a new host real address in the page table.

8 Claims, 10 Drawing Sheets

INFORMATION PROCESSING APPARATUS AND MEMORY CONTROL METHOD

BACKGROUND OF THE INVENTION

1. Field of the Invention

This invention relates to an information processing apparatus that adopts a virtual storage system. More particularly, the invention relates to a memory control method that constructs a virtual computer system, using a translation table indicating a correspondence between a guest virtual address and a host real address as an address translation table.

2. Description of the Related Art

A virtual storage system generally controls a correspondence between a virtual memory space and a real memory space, using the unit of block called "page." FIG. 3 shows a conception of translating a virtual address to a real address. A virtual address 310 comprises a virtual page number 311 and a page offset 312. A page table 331 is an address translation table allocated to a real memory space (main storage) 320, and the page table 331 stores real addresses (real pages) of individual virtual pages. Supposing the virtual page number is represented as "n," the real address of each virtual page is stored in line 332 in the n-th location. A page table base register (PTBR) 330 indicates the real address (page table address pointer) of the page table 331, which is currently used by a processor (real computer), on the real memory space 320. By rewriting the PTBR 330, two or more page tables, i.e., two or more virtual spaces can be switched/used.

Translation from a virtual address to a real address is outlined as follows:
(1) Calculate the page table 331 on the real memory space 320 (main storage) by referring to the PTBR 330.
(2) Calculate a real page stored in the line 332 on the page table 331, depending on the virtual page number 311 in the virtual address 310.
(3) Add the page offset 312 of the virtual address 310 to the low-order bit of the real page, assuming the added real page as a real address, and access the real memory space 320, depending on the real address.

In this manner, the virtual storage system refers to the page table when calculating the real address, so the real memory needs to be accessed twice each time the virtual memory is accessed. To prevent this overhead, generally a processor contains a high-speed address translation buffer memory called "Translation Look aside Buffer (TLB)", and saves in the TLB a correspondence between a virtual page number and a real address (real page), which have been calculated by referring to the page table. If the entry of a virtual page number has been registered in the TLB, the processor searches the TLB and immediately calculates a real address from the entry, when translating the address. Only if the entry of the virtual page number has been unregistered in the TLB, the processor calculates the real address by referring to the page table on the main storage. Then, the processor newly registers the correspondence between the virtual page number and the real address (real page) in the TLB.

When the processor contains the TLB, a software controlling the virtual storage needs to invalidate the content of the TLB (called "TLB purge") to avoid incorrect translation, similarly to an operating system (abbreviated "OS"), when the page table has been rewritten or when the page table base register (PTBR) has been rewritten. A TLB purge occurs in the following cases:

(1) When an instruction of purging a specific entry in the TLB (hereafter called "Entry Purge instruction") is executed.
(2) When an instruction of writing from a program to the PTBR (hereafter called "explicit rewrite") is executed.
(3) When a PTBR rewrite is executed with a task switch.

Then, a brief explanation for the task switch will be made. An information processing apparatus comprises a memory area, called "task state segment (abbreviated as TSS)," for each task, where the processor status is saved when switching a task. For example, when task A is switched to task B, the processor executes the following processing:
(1) Save the register value (including a PTBR value) of the processor during executing a task switch instruction, in the task A TSS.
(2) Write a value from the task B TSS to a register in the processor.

Therefore, if the task B is switched to the task A later, the processor status before the task switch, is restored, depending on the task A TSS value saved in step (1).

On the other hand, a virtual computer system virtually operates one or more OSs on one real computer. For this system, a program called "host" (generally called "VMCP") controls the real computer, generates one or more virtual computers (VM), and operates an independent OS (called "guest") on each virtual computer. FIG. 4 shows the conception of the virtual computer system. This conception represents that OS1 and OS2 operate independently as a guest A 410 and a guest B 420 each under the control of VMCP as a host 400, and that each OS controls applications (AP).

For allocating hardware resources of a single real computer to each virtual computer, there are two methods, i.e., a method of allocating the hardware resources by time-sharing, and a method of logically dividing the hardware resources and allocating the divided resources to each virtual computer. When the virtual computer system controls a memory, the latter method is generally adopted. In this case, the host logically divides the real memory space and allocates a divided area to each guest.

FIG. 5 shows a conception of memory control performed by the virtual computer system as described above. In this embodiment, a part 541 of a real memory space 540 in the host is allocated to the guest A, and a part 542 of the real memory space 540 in the host is allocated to the guest B. Actually, the host generates a host virtual space 521 on the real memory area 541, and the guest A operates, assuming the host virtual space 521 as a real memory space (guest real space). Similarly, the host generates a host virtual space 542 on a real memory area 522, and the guest B operates, assuming the host virtual space 542 as a real memory space (guest real space). In addition, the guest A generates a guest virtual space 501, and the guest B generates a guest virtual space 502. In this case, guest translation tables (guest page tables) 511 and 512 controlled each by the guests A and B, as well as host translation tables (host page tables) 531 and 532 controlled each by the host are used as address translation tables. The guest translation tables 511 and 512 each store the guest real address (host virtual address) of each guest virtual page, and the host translation tables 531 and 532 store the host address of each host virtual page.

When the virtual computer system performs the memory control, as shown in FIG. 5, address translation is performed with the following procedure, when a processor accesses a guest virtual space. In this case, the guest virtual space of the guest A is a target to be accessed. The guest virtual space of the guest B is also accessed with the same procedure. However, an explanation for the PTBR is omitted for simplification.

(1) Translate a guest virtual address (guest virtual page) of the guest virtual space 501 to a guest real address (guest real page), i.e., a host virtual address (host virtual page) by referring to the guest translation table 511. This is called "guest address translation."

(2) Translate the guest real address, i.e., the host virtual address to the host real address (host real page) by referring to the host translation table 531. This is called "host address translation." This host real address indicates a physical area 541 allocated to the guest A on the real memory space 540.

When the processor comprises a TLB, the processor saves a correspondence between a guest virtual address (guest virtual page) and a host real address (host real page) in the TLB, which has been calculated by referring to a guest translation table and a host translation table. First, the processor refers to the TLB when accessing a guest virtual space. If the entry of a guest virtual page number is not found in the TLB, the processor executes two address translations, i.e., a guest address translation and a host address translation, as described above, to calculate the real address (host real address) of the real memory space (host real memory space).

SUMMARY OF THE INVENTION

When the conventional virtual computer system performs memory control, as described above, the processor executes two address translations, i.e., a guest address translation using the guest translation table (guest page table) and a host address translation using the host translation table (host page table), when accessing a guest virtual space. That is, a guest virtual address is first translated to a guest real address (=host virtual address), and secondly to a host real address.

Then, consider the case where the guest virtual address is directly translated to the host real address, focusing on that the guest virtual address is finally translated to the host real address. The conception of this address translation is shown in FIG. 6. This conception is basically the same as that shown in FIG. 3. Merely by referring to a translation table 631, the guest virtual address (guest virtual page) can be translated to the host real address (host real page). The translation table 631 is a map of addresses, which can be created.

A problem on the address translation system as shown in FIG. 6 is found in that a guest controls a guest virtual address and a host controls a real memory. For example, if the host controls the translation table 631, the content of the translation table (guest page table) rewritten by the guest may not be correctly reflected in the content of the translation table 631 (host page table).

An object of this invention is to solve the above problem, enable a table of translating a guest virtual address to a host real address to be used without a trouble, and speed up address translation by referring to a translation table when a processor accesses a guest virtual space.

According to this invention, a processor comprises a means of detecting a TLB purge, a means of detecting a PTBR read, and a means of generating an exception interrupt when the TLB purge or PTBR read is detected, so as to construct a virtual computer system using a translation table (page table) as a table of translating a guest virtual address to a host real address.

A host is invoked by an exception interrupt. When a TLB purge occurs, the host examines a virtual space change processing executed by a guest, calculates a new guest virtual address and a new host real address, and writes the correspondence between the guest virtual address and the host real address to the page table. This processing may correctly reflect the content of the virtual space changed by the guest, in the host page table. When the PTBR read is executed, the host examines the memory or register to which the guest has written a value of the PTBR and rewrites the guest virtual address to the guest real address in the guest page table. This enables the guest real address in the guest page table to be calculated when the processor accesses the guest page table using the guest PTBR.

A page table rewrite merely means a memory rewrite, which is difficult for the processor to discriminate from other memory access from other OSs except the guest OS. However, when a page table has been rewritten, the TLB content does not coincide with that of the page table, so a memory control program such as the OS necessarily executes a TLB purge. By monitoring the TLB purge, therefore, the page table rewrite may be detected indirectly. In addition, the page table change may be also detected similarly, because the TLB purge is executed at the same time when a PTBR write is executed.

Focusing on this process, this invention enables to a guest page table switch or page table entry rewrite to be detected by adding a means of monitoring a TLB purge and generating an exception to a processor.

When a guest rewrites a guest page table entry, the guest may read the PTBR. In this case, the PTBR contains the host real address, which has been set by the host, and the page table has been created by the host. Thus, a PTBR value, which is received by the guest, must be translated to a guest real address in the guest page table by monitoring the guest's PTBR read.

Focusing on this process, this invention enables the PTBR read to be detected by adding a means of monitoring a PTBR read and generating an exception to a processor, similarly to the case where the TLB purge is monitored.

As explained above, the virtual computer system can perform memory control, by using the page table, which is controlled by the host, as a table of translating the guest virtual address to the host real address.

DESCRIPTION OF THE PREFERRED EMBODIMENTS

Figure 1:
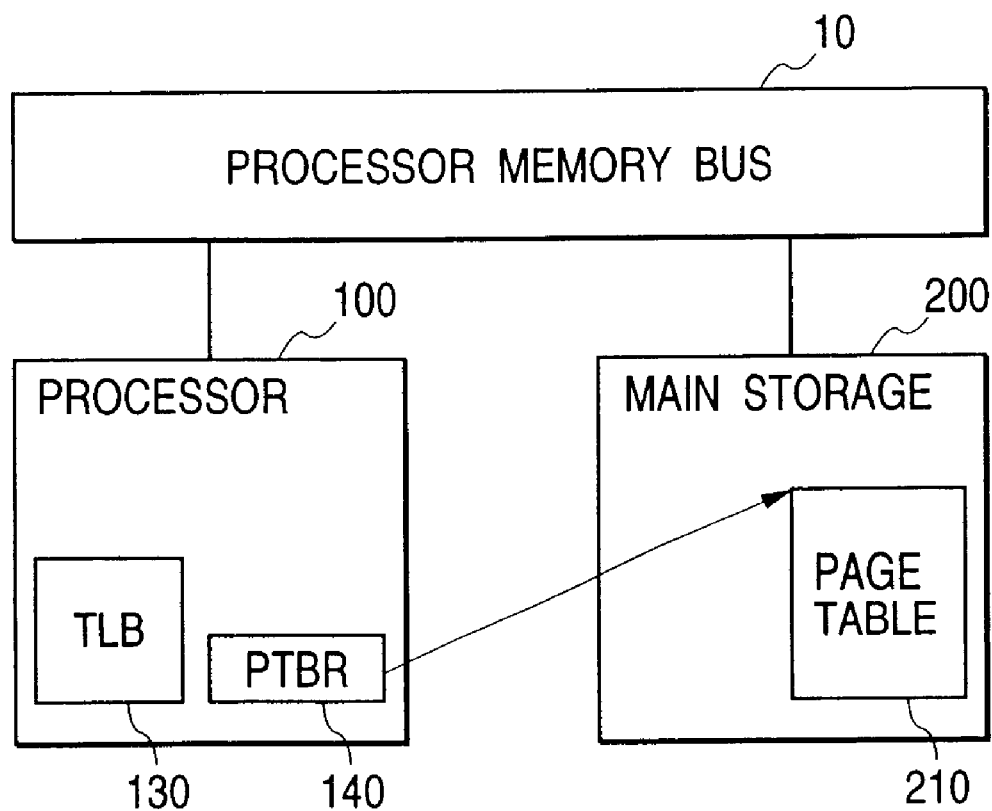
FIG. 1 is a schematic block diagram of an information processing apparatus to which this invention is applied.

Referring to the drawings, preferred embodiments of this invention are described as follows. However, the invention is not limited by the preferred embodiments.

Figure 4:
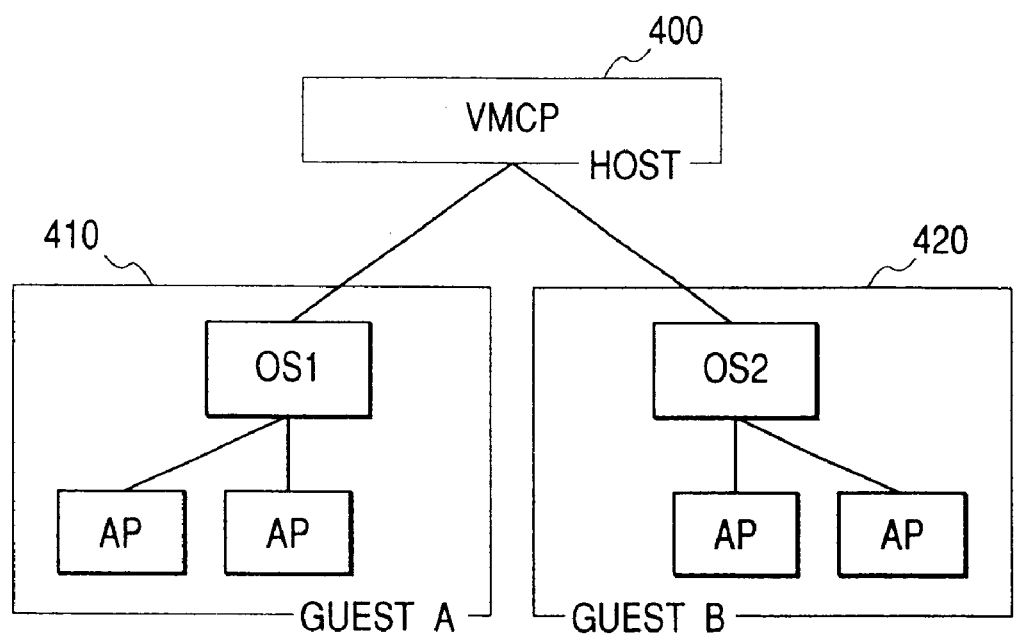
FIG. 4 shows a conception of a virtual computer system.
Figure 5:
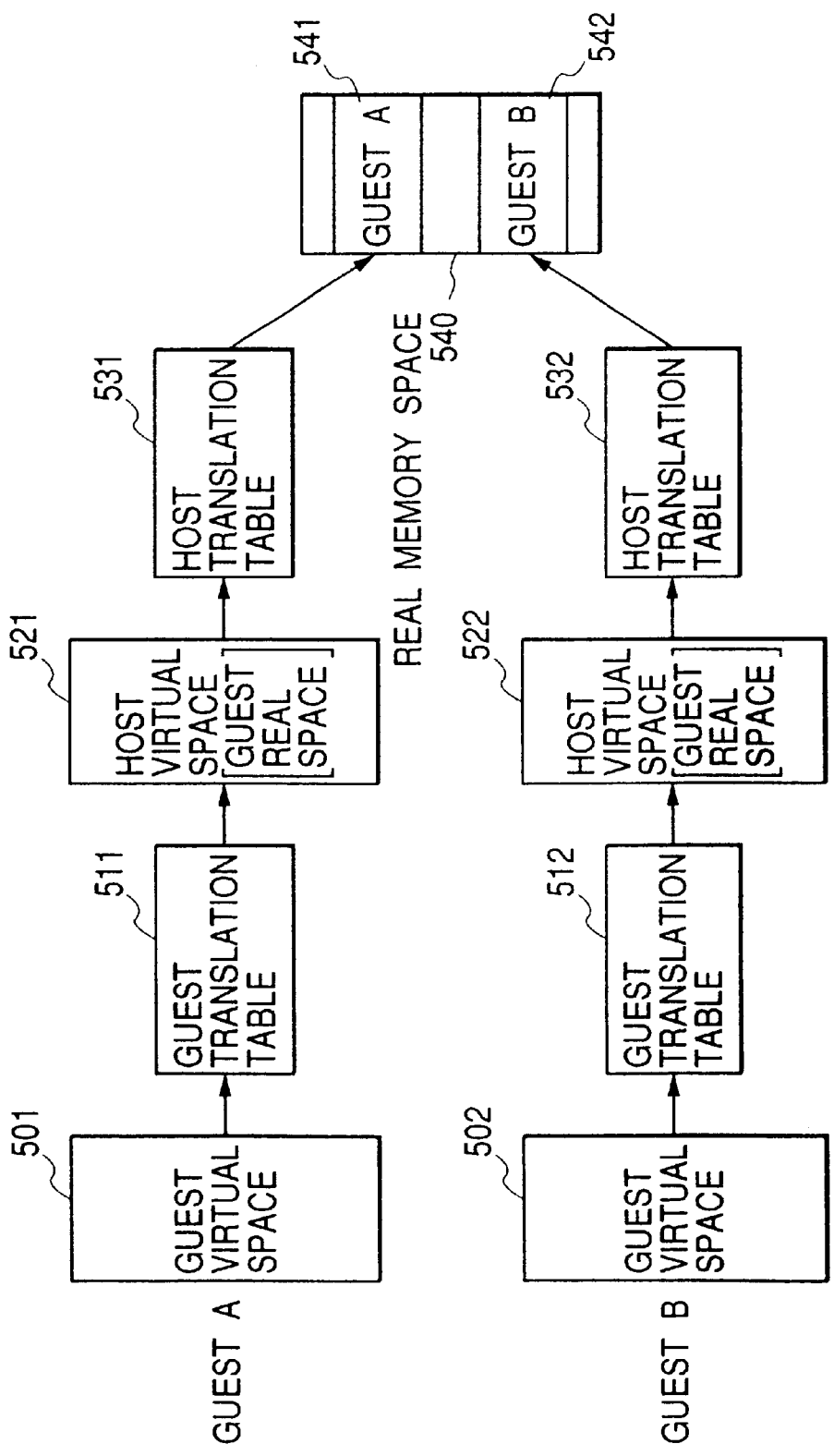
FIG. 5 shows a conception of a memory space in the virtual computer system.
Figure 6:
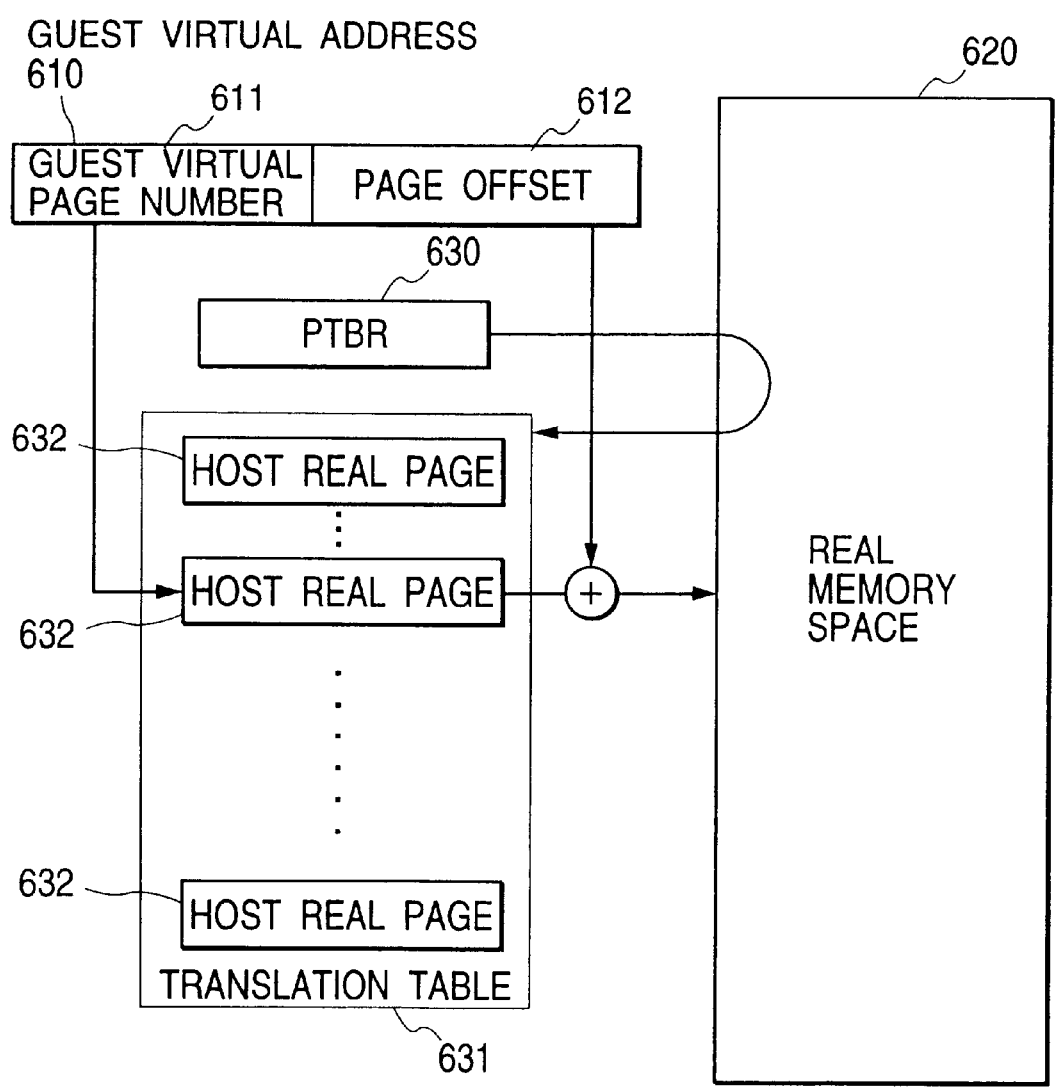
FIG. 6 shows a conception of translating a guest virtual address to a real address according to this invention.

FIG. 1 is a schematic block diagram of an information processing apparatus to which this invention is applied. As shown in FIG. 4, a virtual computer is constructed on the information processing apparatus by operating a host and guests. In FIG. 1, a processor 100 is connected to a main storage 200 through a processor memory bus 10. A page table (host page table) 210, which is controlled by the host, is contained in a main storage 200. The page table 210 is the same as a translation table 631 shown in FIG. 6, and contains host real addresses (host real pages) of individual guest virtual pages. The main storage (real memory space) 200 contains a page table (guest page table), which is originally controlled by a guest but not shown in FIG. 1. The processor 100 comprises an address translation buffer memory (TLB) 130 and a page table base register (PTBR) 140. A correspondence between a guest virtual address (guest virtual page) and a host real address (host real page), which have been calculated, is registered in the TLB 130. The real address of the page table 210 in the main storage 200 is stored in the PTBR 140.

When accessing a guest virtual space, the processor 100 first refers to the TLB 130. If the entry of a guest virtual page number corresponding to a guest virtual address is found in the TLB 130, the processor 100 calculates a corresponding host real page from the entry, adds the page offset of the guest virtual address to the host real page, and accesses the main storage 200. Unless the entry of the guest virtual page number corresponding to a guest virtual address is found in the TLB 130, referring to a page table (host page table) 210 in the main storage 200 through the PTBR 140, the processor 100 calculates a host real page corresponding to the guest virtual page, adds the page offset of the guest virtual address to the host real page, and accesses the main storage 200. At this time, the processor 100 newly registers the correspondence between the guest virtual page and the host real page, which have been calculated, in the TLB 130.

Figure 2:
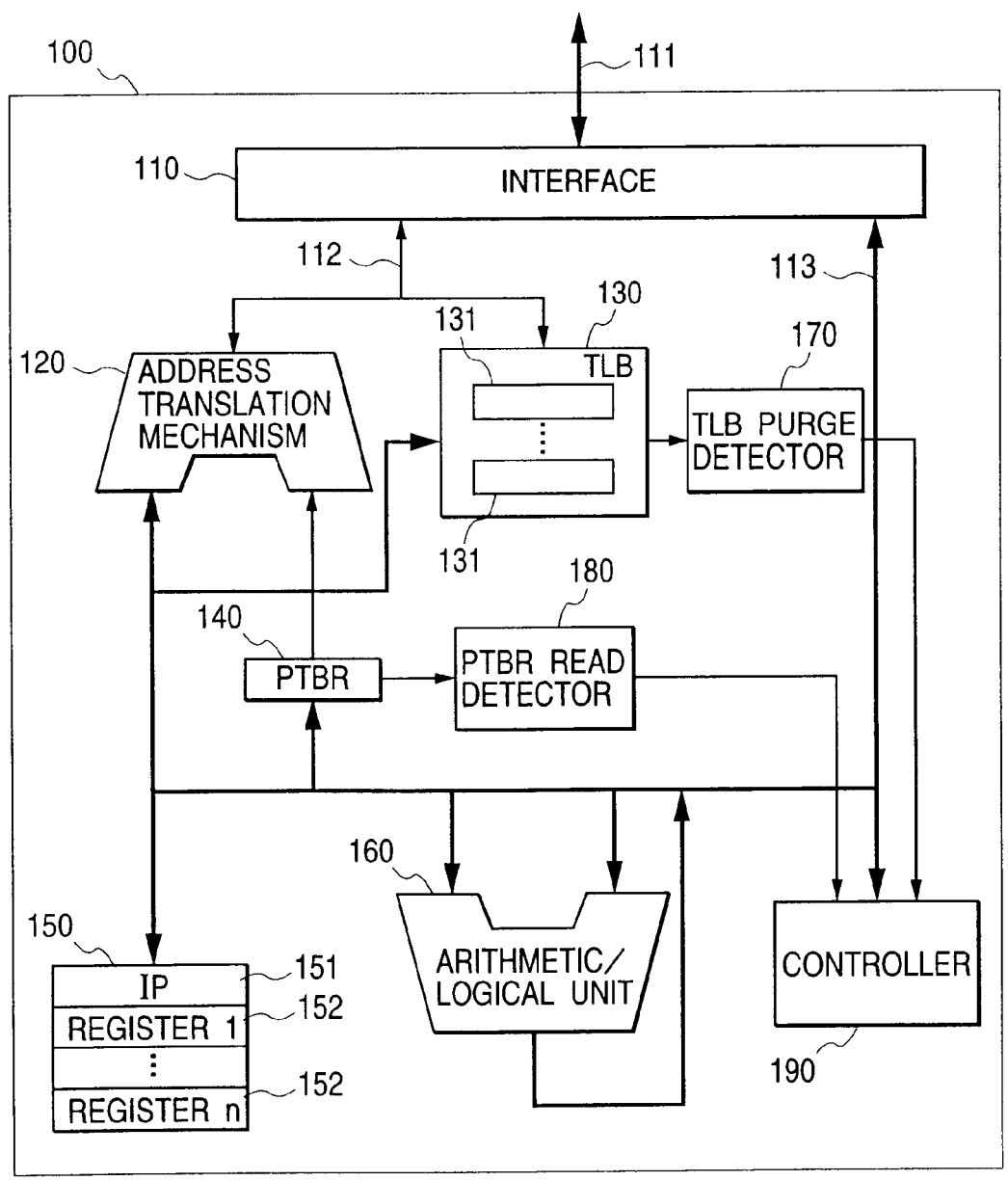
FIG. 2 is a detailed block diagram of an embodiment of a processor according to this invention.

FIG. 2 shows the detailed configuration of an embodiment of the processor 100 according to this invention. In FIG. 2, reference numeral 111 indicates an external bus of the processor 100, reference numeral 112 does an internal address bus of the processor 100, and reference numeral 113 does an internal data bus of the processor 100. An interface 10 sends/receives an address or data between the external bus 111, internal bus 112, and internal data bus 113 of the processor 100. If the entry of the guest virtual page as the guest virtual address, that an address translator 120 has received from an instruction pointer (IP) 151 in a register group 150, is not found in the TLB 130, the address translator 120 accesses the page table (host page table) 210 in the main storage 200, indicated by the PTBR 140, to calculate a host real page corresponding to the guest virtual page. Then, the address translator 120 adds the page offset of the guest virtual address to the host real page, and outputs the host real page to the internal address bus 112. The TLB 130 receives the guest virtual address from the instruction pointer (IP) 151. Then, if an entry 131 for storing the guest virtual address is found in the TLB 130, the TLB 130 calculates a host real page to be paired with the guest virtual page, adds the page offset of the guest virtual address to the host real page, and outputs the host real page to the internal address bus 112. When the address translator 120 operates, the TLB 130 writes a pair of the guest virtual page and the host real page to the entry 131. The register group 150 comprises the instruction pointer 151 and other registers 152. At this time, the instruction pointer 151 stores a guest virtual address having an instruction to be executed next by the processor 100. When the processor 100 reads the instruction from the main storage 200, the guest virtual address of the IP 151 is translated to the guest real address by the address translator 120 or TLB 130, and output from the interface 110. An arithmetic/logic unit 160 executes various operations, as well as writes to the PTBR 140 and updates the IP 151.

A TLB purge detector 170 monitors the processing of the TLB 130. If a TLB purge occurs, the TLB purge detector 170 notifies the TLB purge to a controller 190. A PTBR read detector 180 monitors the PTBR 140 read/write. If the value of the PTBR 140 is read, the PTBR read detector 180 notifies the PTBR 140 read to the controller 190. The controller 190 controls various sections in the processor 100, according to an instruction read by the processor 100. In addition, the controller 190 executes an exception handling when being notified of the TLB purge or PTBR read by the TLB purge detector 170 or PTBR read detector 180, and generates an interrupt to the host.

The following provides an detailed explanation for the TLB purge exception handling or PTBR read exception handling. To simplify the explanation, a guest page size is assumed to be equal to a host page size as 1 byte. At this time, the virtual address is assumed to be equal to the virtual page number of the guests or host, and a host real address (host real page) corresponding to each guest virtual address (guest virtual page) is stored in the page table 210 in the main storage (real memory space) 200. However, it can be easily known by analogy that this invention can be applied to an optional page size.

Figure 7:
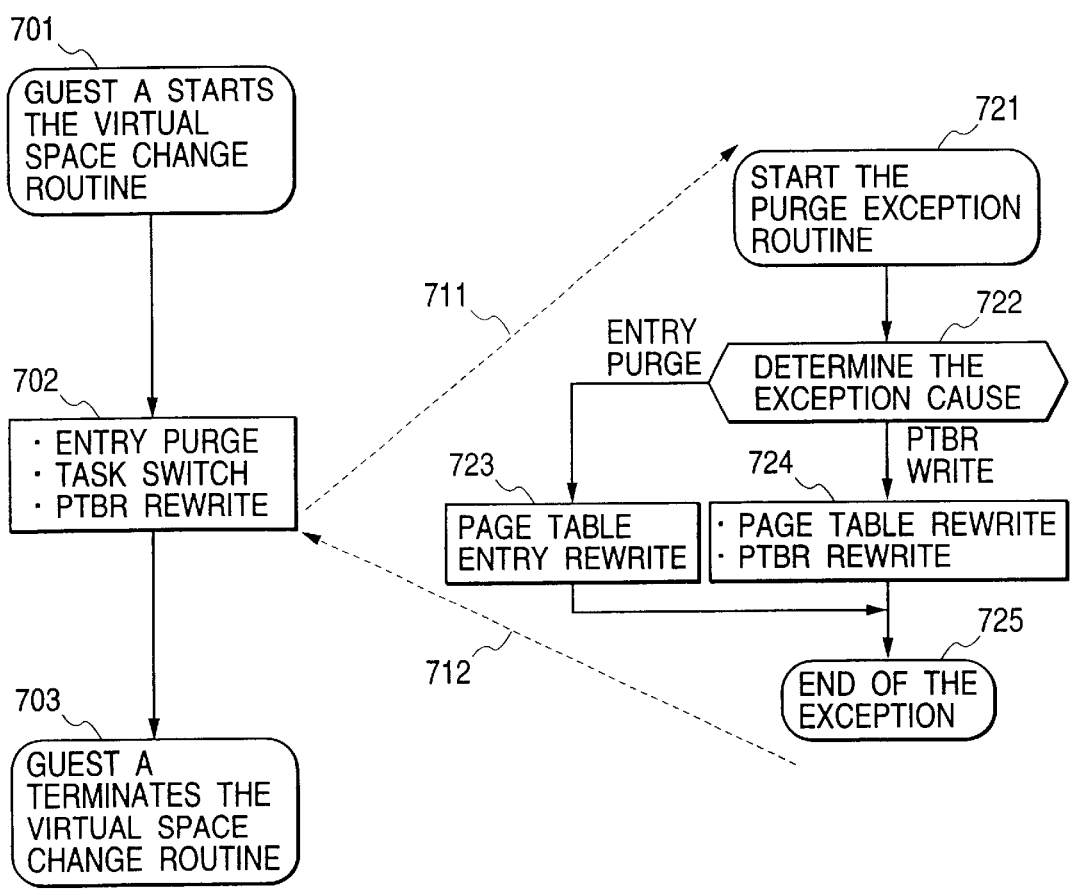
FIG. 7 shows a flow of TLB purge exception handling according to this invention.

First, the TLB purge exception handling is explained as follows. FIG. 7 shows a flow of TLB purge exception handling.

The guest A changes the virtual space configuration by executing one of the following methods, any of which cause a TLB purge.

Entry rewrite: Rewrite for each entry. The entry of the guest page table is rewritten. An Entry Purge instruction is used for executing this method.

PTBR write: Explicit PTBR rewrite. The guest page table is switched.

Task switch: PTBR rewrite executed together with the task switch. The guest page table is switched.

Suppose that guest A starts a virtual space change routine (step 701) and executes one of entry purge, PTBR write, and task switch (step 702) so as to switch a guest page table or rewrite an entry of the guest page table. This processing causes an entry of the TLB 130 to be purged. Then, the guest A terminates the virtual space change routine (step 703). In the processor 100, the TLB purge detector 170 detects a purge in the TLB 130, and notifies the TLB purge to the controller 190. The controller 190 controls the processor 100 and executes the following exception start processing:

(1) Read the address of the next instruction on the virtual address where the instruction causing an exception is stored, and save the address in a specific area (called "stack") on the main storage 200.

(2) Examine the address of the TLB purge exception routine and write the address to the IP 151.

(3) Read an instruction from the address stored in the IP 151, and generate an exception interrupt to the host. This processing is indicated by reference numeral 711.

After this processing, the host starts a TLB purge exception routine (step 721). First, the host calculates the address of the instruction causing an exception, from the content of the stack, reads the instruction, and determines which processing the guest A has executed (step 722). Then, the routine is branched to step 723 when an entry purge is executed, or to step 724 when a PTBR write or task switch is executed.

The host processing in the step 723 is explained as follows. This processing is executed when a TLB Entry Purge instruction is executed after the guest A completely rewrites the entry of the guest page table. In this case, the TLB Entry Purge instruction is described in the format of "EntPg x" and purges a TLB entry where a correspondence between a virtual address X and a real address is saved.
(1) Read the instruction causing an exception, and calculate an argument "x" of the EntPg instruction.
(2) Calculate a guest real address "y" allocated to a guest virtual address "x."
(3) Calculate a host real address "z" to be allocated to the guest real address "y."
(4) Rewrite the entry on the host page table 210 to translate "x" to "z."

The host processing in the step 724 is explained as follows:
(1) Read the value of the PTBR 140 (where a guest real address is assumed as "u").
(2) Examine whether a host page table corresponding to a guest page table allocated to the guest real address "u" has been created in the following steps 3 to 6. If the host page table has been created, write the host real address to the PTBR 140 and terminate the exception handling.
(3) Calculate a host real address "v" corresponding to the guest real address "u."
(4) Examine the guest page table, using the host real address "v," and calculate a pair of a guest virtual address and a guest real address from each entry.
(5) When the pair in (4) includes the guest virtual address "x" and the guest real address "y," calculate the guest real address "z" to be allocated to the guest real address "y," and create a pair of the guest virtual address "x" and the guest real address "z."
(6) Create the host page table 210 from the pair in (5).
(7) Rewrite the value of the PTBR 140 to the host real address of the host page table 210 created in (6).

As described above, the correspondence between the guest virtual address and the host real address may be maintained in the page table 210 by continuously reflecting the content of the page table, switched or rewritten by the guest A, in the page table (host page table) 210 of the main storage 200.

After the processing in the step 723 or 724, the host terminates the TLB purge exception routine (step 725) and control is returned from the host to the guest A (step 712).

Figure 8:
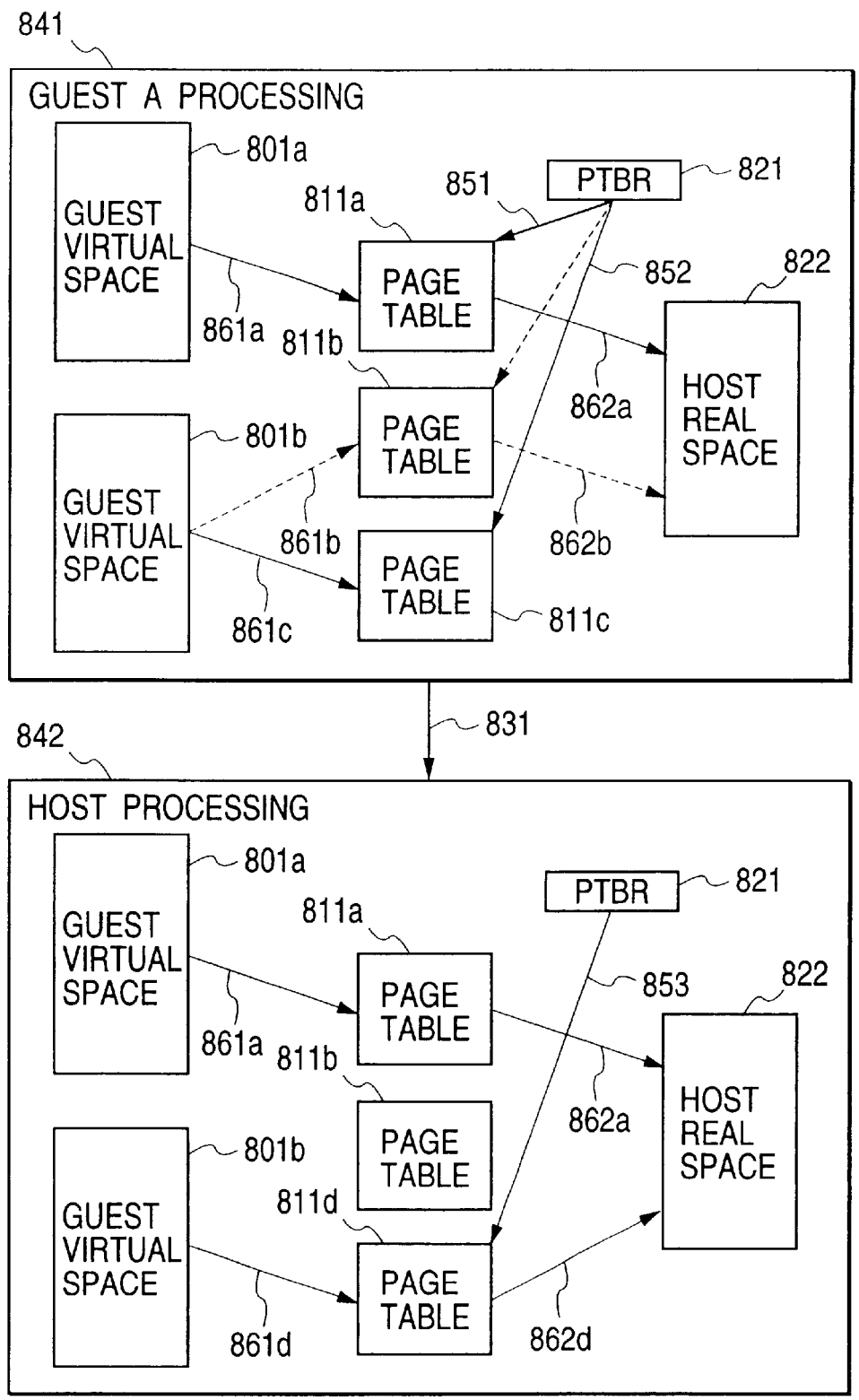
FIG. 8 shows a conception of guest/host processing when the guest virtual space is switched according to this invention.

FIG. 8 shows a conception of guest/host processing when the guest virtual space is switched. This outlines the guest/host processing when the guest A rewrites a PTBR 821 and switches a guest virtual space 801a to a guest virtual space 801b (PTBR write or task switch). The guest A executes a flow of processing in 841, and the host executes a flow of processing in 842 (step 724 in FIG. 7).

The guest A executes the following processing to set a correspondence between reference numerals 861b and 862b:
(1) Provide a page table (guest page table) 811b for a virtual space 801b.
(2) Write the guest real address of the guest page table 811b to the PTBR 821.

On the other hand, the processor interprets the content of the PTBR 821 as a real address (=host real address). At the result, a memory area 811c, which is not a page table, is used as a page table (reference numeral 852). The guest page table 811b is a guest page table that has been created by the guest A, and contains the guest real address.

According to this invention, the processor detects a PTBR 821 write (TLB purge detected) and generates an interrupt to the guest processing to move the processing to the host (reference numeral 831). At this time, the host executes the following processing (step 724 in FIG. 7):
(3) Create a page table (host page table) 811d as a host real address corresponding to the guest real address of an entry in the guest page table 811b.
(4) Write the host real address of the host page table 811d to the PTBR 821.

By the above host processing, a correspondence between reference numerals 861d and 862d may be set, and the content of the virtual space switched by the guest A may be correctly reflected in the host page table 811d.

Figure 9:
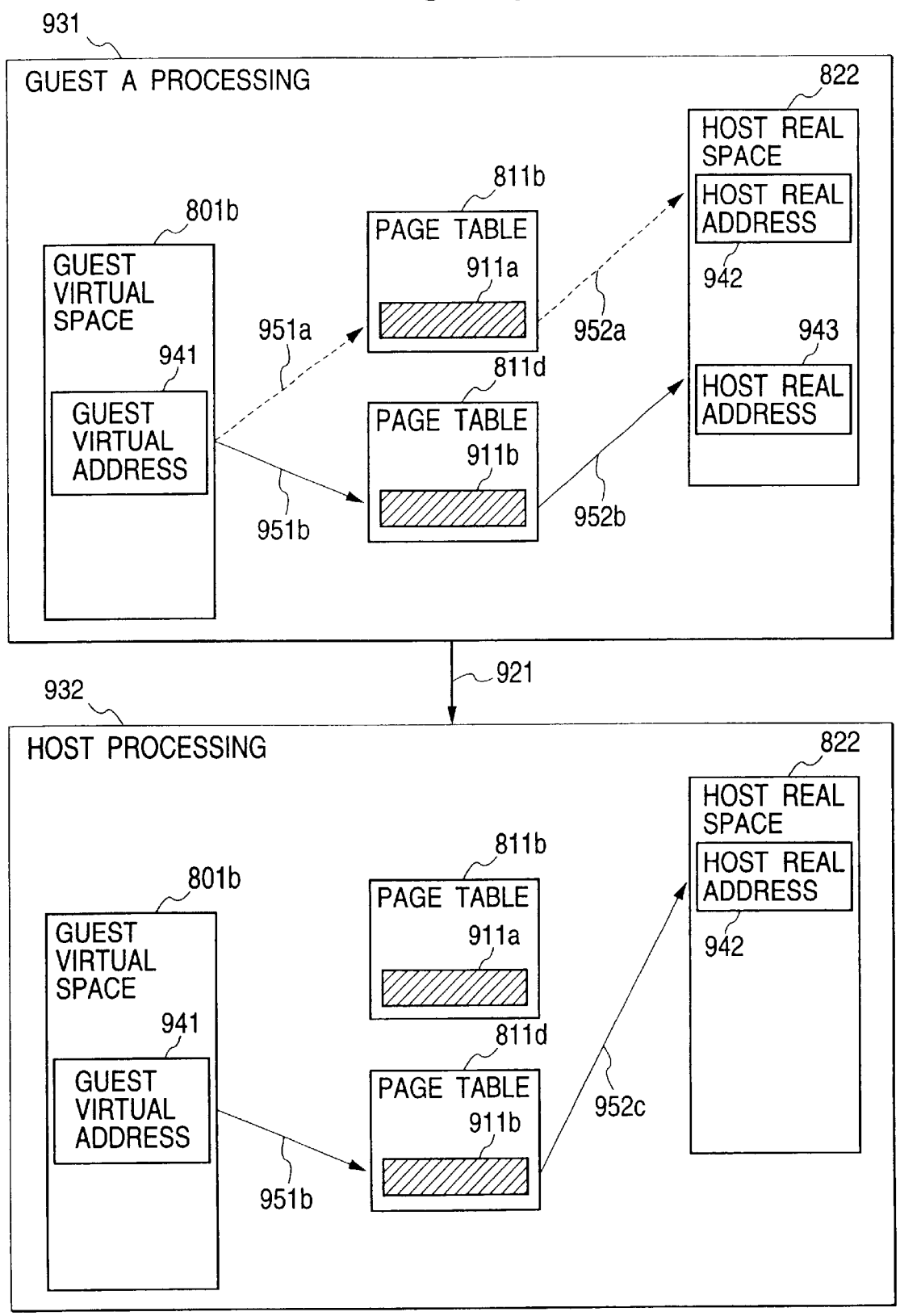
FIG. 9 shows a conception of guest/host processing when an entry in the guest page table is rewritten according to this invention.

FIG. 9 shows a conception of guest/host processing when an entry in the guest page table is rewritten. This outlines the processing after FIG. 8 when the guest A rewrites an entry in the guest page table. The guest A executes a flow of processing in 931, and the host executes a flow of processing in 932 (step 723 in FIG. 7).

The guest A rewrites an entry in the page table, attempting to allocate a guest virtual address 941 to a host real address 942 (for the purpose of setting a correspondence between reference numerals 951a and 952a). However, the guest A does not recognize the host processing in FIG. 8. Thus, the guest A rewrites an entry 911a in a guest page table 811b, as a page entry of the guest virtual address 941. Actually, the processor uses an entry 911b in a host page table 811d, as an entry corresponding to the virtual address 941. Therefore, the above rewrite by the guest A is not significant and the value written to the entry 911a is also a guest real address.

According to this invention, the processor detects the entry 911a rewrite (TLB purge detected), and generates an interrupt to the guest processing to move the processing to the host (reference numeral 921). At this time, the host executes the following processing (step 723 in FIG. 7):
(1) Calculate the host real address of the entry 911a.
(2) Read the entry 911a.
(3) Calculate a host real address (equivalent to a host real address 942) corresponding to a virtual address indicated by the entry 911a.
(4) Calculate the entry 911b corresponding to the entry 911a in the host page table 811d.
(5) Write the address of the real address 942 to the entry 911b.

By the above host processing, the content of the table entry rewritten by the guest A is correctly reflected in the host page table 811d, as indicated by reference numerals 951b and 952c.

As described above, by continuously reflecting the content of the page table switched or rewritten by the guest, in the host page table, the correspondence between the guest virtual address and the host real address may be maintained in the host page table.

Figure 10:
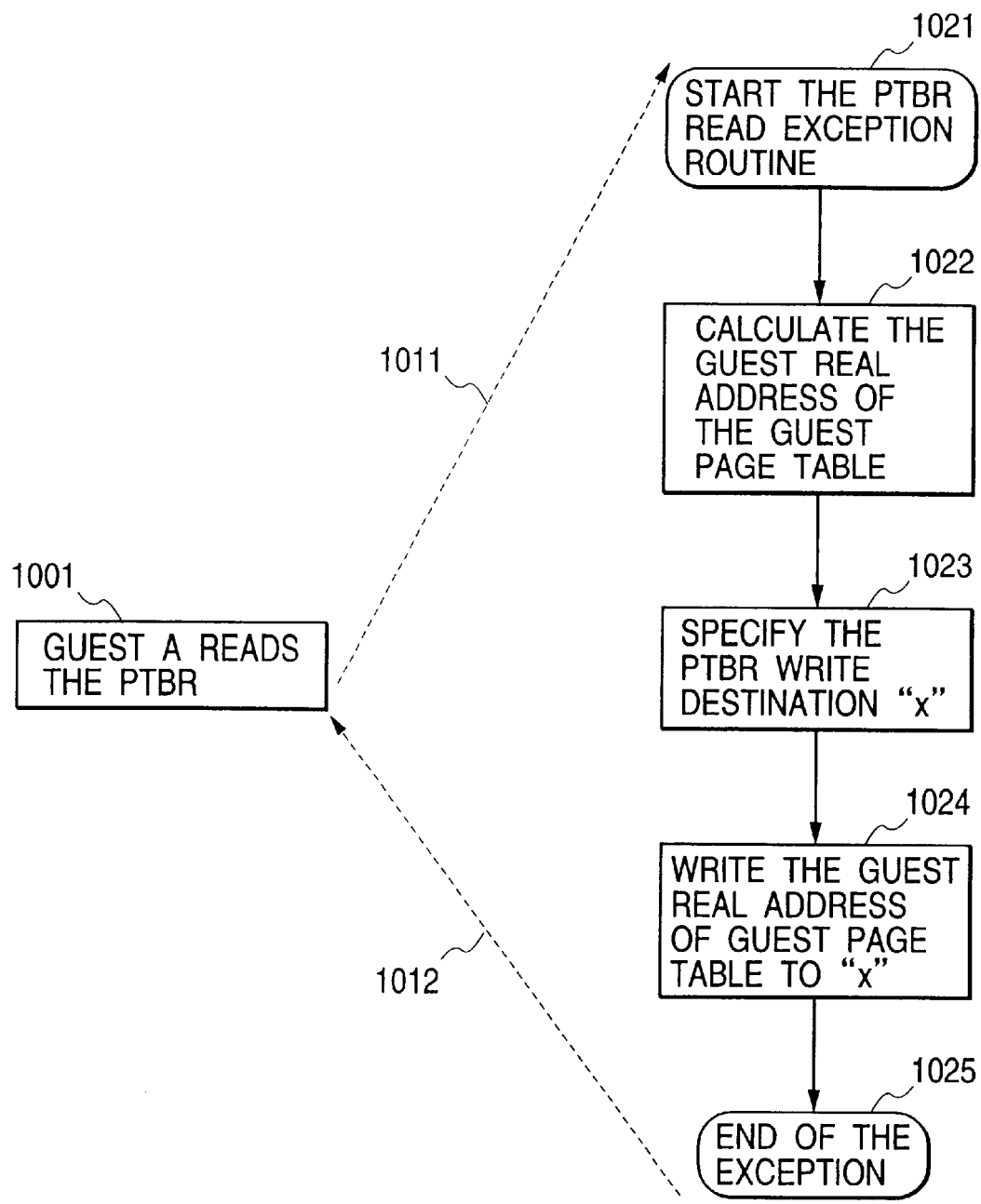
FIG. 10 shows a flow of PTBR read exception handling by the processor according to this invention.

According to this invention, the host rewrites the value of the PTBR 140 (or PTBR 821 in FIG. 8) in the processor 100, which has been set by the guest, as shown by the step 724 in FIG. 7 (or step 842 in FIG. 8). However, the guest may read the entry 131 when the entry rewrite is executed. Even if the guest reads the value of the entry 131, the guest real address of the guest page table cannot be calculated. According to this invention, the PTBR read detector 180 of the processor 100 monitors the operation of the PTBR 140, and the controller 190 generates a PTBR read exception when the guest reads the PTBR 140, like when a TLB purge occurs. Referring to FIG. 10, the operation of the PTBR read exception is explained as follows.

Then, suppose that the guest A reads the PTBR 140 in step 1001. At this time, the PTBR read detector 180 detects the PTBR 140 read and notifies the PTBR read to the controller 190. The controller 190 controls the processor 100 and starts the PTBR read exception handling. The processing of moving to an exception routine for saving the executed address is the same as the TLB purge exception handling. After this processing is executed, control is moved to a PTBR read exception routine (step 1011). After the exception handling is terminated, control is returned to an instruction next to the guest-A PTBR read instruction on the virtual address (step 1012).

The PTBR read exception routine is executed by the host, and operated as follows. The host starts the PTBR read exception routine (step 1021) and calculates the guest real address of a guest page table in a guest that has read the PTBR 140 (step 1022). Then, the host examines the address of an instruction causing a PTBR read exception, from the content of the stack, read the instruction, and determines which register or memory (indicated by "x") the value of the PTBR 140 has been written to (step 1023). The host writes the guest real address calculated in the step 1022 to the above write destination (step 1024).

As explained above, the guest real address of the guest page table may be calculated by the guest A reading the PTBR 140.

According to this invention, a processor merely comprises a TLB detector and a PTBR read detector, so the instruction set or external bus interface is not changed. Therefore, if a processor is changed and a host is provided for an information processing apparatus in FIG. 1 and OSs operated on the information processing apparatus, a virtual computer may be constructed with the OSs as guests, referring to a table of translating a guest virtual address to a host real address.

However, there are other information processing apparatus that perform address translation with the following virtual address configurations:

Virtual address=Page directory number+virtual page number+page offset (1)

Virtual address=Page directory pointer number+page directory number+virtual page number+page offset (2)

In case of (1), address translation is performed, referring to the following two tables:
(1a) Page directory table: Real address table of a page table with page directory number used as indexes.
(1b) Page table: Same as that in FIG. 3.

Figure 3:
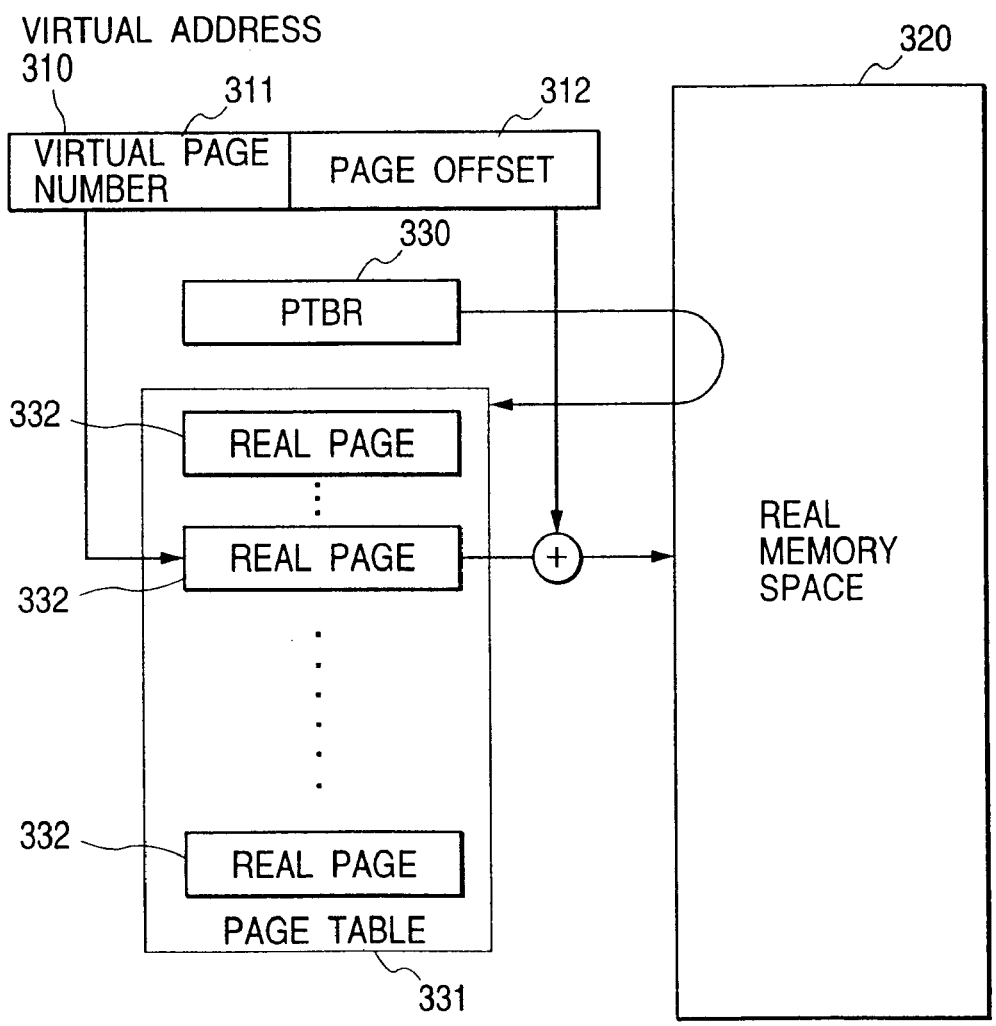
FIG. 3 shows a conception of translating a virtual address to a real address.

To translate a virtual address to a real address, the real address of a page table is calculated from the page directory table, and the same processing as FIG. 3 is executed. A virtual space must be switched by rewriting a register where the real address in (1a) is saved.

In addition, in case of (2), address translation should be performed, using the following three tables:
(2a) Page directory pointer table: A map of real addresses in a page directory table with page directory pointer numbers used as indexes.
(2b) Page directory table: Same as 1a.
(2c) Page table: Same as the page table in FIG. 3.

To translate a virtual address to a real address, the real address of the page directory is calculated from the page directory pointer table, and the address translation in (1) is executed. A virtual space must be switched by rewriting a register where the real address in (2a) is saved.

Because the information processing apparatus comprises a register equivalent to a PTBR, the virtual space can be switched by monitoring the register, so as to switch the virtual space in both cases of (1) and (2). If a processor comprises a TLB, a TLB purge necessarily occurs when changing the correspondence between the virtual address and the real address. Therefore, a change in the virtual space configuration in the unit of page can be detected by monitoring the TLB purge. In addition, this invention can be applied to the cases similar to (1) and (2).

What is claimed is:

1. An information processing apparatus comprising a host program for logically dividing a real memory and allocating divided memory areas to one or a plurality of virtual computers, said apparatus operating an independent guest OS running on the virtual computers, and using a translation table indicating a correspondence between a guest virtual address and a host real address for address translation, comprising:

an address translation buffer memory (TLB) for holding a pair of a guest virtual address and a host real address which have referred to said translation table;

means for detecting a purge of said TLB;

means for generating an exception interrupt when said TLB purge is detected;

a translation table base register (PTBR) for holding a real memory address in said translation table;

means for detecting a reading operation of said PTBR;

means for generating an exception interrupt when the reading operation of said PTBR is detected; and means for rewriting the correspondence between the guest virtual address and the host real address in said translation table in response to said generated exception interrupt.

2. The information processing apparatus according to claim 1, wherein, when the reading operation of said PTBR is detected, said host examines a destination to which the guest has written a value of the PTBR and rewrites the address of said write destination to a guest real address of a guest translation table.

3. A memory control method for constructing a virtual computer by using a translation table indicating a correspondence between a guest virtual address and a host real address for address translation, comprising the steps of:

holding a pair of guest virtual address and a host real address that have referred to said translation table, in an address translation buffer memory (TLB);

purging the content of said TLB when said translation table is referred to;

generating an exception interrupt when said TLB purge is detected;

rewriting the correspondence between the guest virtual address and the host real address in said translation table in response to said generated exception interrupt;

calculating the address of the instruction that caused an exception to specify a processing executed; and rewriting an entry in said translation table when said specified processing is an entry purge.

4. The memory control method according to claim 3, wherein, when said specified processing is an entry purge, said translation table entry rewriting step further comprises the steps of:

calculating a guest real address allocated to a guest virtual address;

calculating a host real address to be allocated to said guest real address; and rewriting the entry in a host page table so as to translate said guest virtual address to the host real address.

5. A memory control method for constructing a virtual computer by using a translation table indicating a correspondence between a guest virtual address and a host real address for address translation, comprising the steps of:

holding a pair of a guest virtual address and a host real address that have referred to said translation table, in an address translation buffer memory (TLB);

purging the content of said TLB when said translation table is referred to;

generating an exception interrupt when said TLB purge is detected;

rewriting the correspondence between the guest virtual address and the host real address in said translation table in response to said generated exception interrupt;

reading a translation table base register (PTBR) for holding a real memory address in said translation table;

generating an exception interrupt, when a reading operation of said PTBR is detected; and rewriting the correspondence between the guest virtual address and the host real address in said translation table in response to said generated exception interrupt.

6. The memory control method according to claim 5, wherein said translation table rewriting step further comprises the steps of:

examining a memory to which the guest has written a value of said PTBR; and rewriting said memory address to a guest real address in said translation table.

7. A memory control method for constructing a virtual computer by using a translation table indicating a correspondence between a guest virtual address and a host real address for address translation, comprising the steps of:

holding a pair of a guest virtual address and a host real address that have referred to said translation table, in an address translation buffer memory (TLB);

purging the content of said TLB when said translation table is referred to;

generating an exception interrupt when said TLB purge is detected;

rewriting the correspondence between the guest virtual address and the host real address in said translation table in response to said generated exception interrupt;

reading a translation table base register (PTBR) for holding a real memory address in said translation table;

generating an exception interrupt, when a reading operation of said PTBR is detected; and rewriting the correspondence between the guest virtual address and the host real address in said translation table in response to said generated exception interrupt;

calculating a guest real address in a guest page table of a guest that has read said PTBR;

specifying a destination to which a value of said read PTBR is written; and writing said guest real address to said destination.

8. A processor performing address translation by referring to a translation table indicating a correspondence between a guest virtual address and a host real address, comprising:

an address translation buffer memory (TLB) for holding a pair of a guest virtual address and a host real address which have been calculated by said address translation;

means for detecting a purge of said TLB;

means for generating an exception interrupt when said TLB purge is detected;

a translation table base register (PTBR) for holding a real address of said translation table;

means for detecting a reading operation of said PTBR; and means for generating an exception interrupt when the reading operation of said PTBR is detected.

* * * * *